May 17, 1966 — R. E. JACOBSON — 3,251,264
PROJECTION SCREEN AND METHOD
Filed April 5, 1962

INVENTOR.
Robert E. Jacobson
BY Wallenstein,
Spangenberg &
Hattis
Attys

United States Patent Office 3,251,264
Patented May 17, 1966

3,251,264
PROJECTION SCREEN AND METHOD
Robert E. Jacobson, Elk Grove Village, Ill., assignor to Radiant Manufacturing Corporation, Morton Grove, Ill., a corporation of Illinois
Filed Apr. 5, 1962, Ser. No. 185,467
6 Claims. (Cl. 88—28.91)

This invention relates to projection screens for use in exhibiting pictures projected thereon and, more particularly, to an improved projection screen of the type characterized by having a backing fabric laminated to the reverse side of the light-reflecting surface.

Laminated projection screens for presenting to a field of observation the image of an object region projected thereon frequently are constructed by pressing a sheet, usually formed of a suitable plastic material, generally thermoplastic in nature, into the meshes of the fabric by calendering or the like. The composition and thickness of the plastic sheet is controlled in accordance with the resultant physical characteristics desired of the final screen from the standpoint of flexibility or stiffness. The plastic sheet may be formed from a white-pigmented plastic material in which case the unlaminated surface thereof will serve as the light reflecting surface. Otherwise, a specularly reflecting surface is formed on the unlaminated surface of the plastic sheet by either applying a white pigment coating of titanium dioxide in a suitable carrier thereto, or a coating of highly reflective, uniformly distributed metal particles, generally of silver or aluminum, or by adhesively securing reflective backed glass beads to the plastic surface. A light absorbent material such as a solvent thinned paint or lacquer usually is coated on the vertical margin of the light-reflecting surface of the plastic sheet to a width sufficient to reduce extreme differences in brightness, sometimes referred to as "marginal fuzz," that frequently occur at the edges of the image projected on the light-reflecting surface. Customarily, fabrication of the screen is completed by passing the laminate between accurately formed embossing rolls to provide the desired specular surface contour.

Laminated projection screens produced in accordance with the conventional practices hereinabove outlined have the objectionable tendency to curl along their free vertical edges when they are supported and tensioned in a manner to provide a substantially flat exhibiting surface. This phenomenon is due, largely, to differences in the thermal expansivity and moisture absorption characteristics of the various dissimilar materials of which the screen is fabricated. The backing fabric, for example, will exhibit a greater affinity for moisture than will the plastic sheet. Similarly, the light-reflecting surface will react differently to atmospheric temperature conditions than will either the painted or lacquered border areas, or the backing fabric-plastic sheet laminate.

Further contributing causes to edge curl in projection screens can be found in the mechanical processing steps to which the plastic sheet is subjected during its formation and application to the backing fabric. Not infrequently such steps include extrusion and calendering procedures which create stress inbalances in the sheet. Relaxation of these forces after the sheet has been applied to the backing fabric often cannot adequately be counterbalanced, especially along the unsupported marginal areas of the screen, and edge curl develops.

Apart from moisture, temperature and mechanical related causes of screen edge curl, a further contributing factor can be ascribed to the use of solvent thinned paints or lacquers sometimes employed in forming the colored surround or marginal border on the screen surface. To achieve a suitable bond between the plastic sheet and the black border forming substance, the solvent must attack and swell the surface of the plastic to a certain extent. The resulting difference in density of the marginal edge portions of the plastic sheet adds to the undesired edge curl.

The degree of edge curl in the screen resulting from the unequal stresses produced therein from whatever cause may in some instances be so severe that irregular and distorted reflection of the projected image will occur. This condition is objectionably noticeable and distracting to the viewer, and, so far as is known, no adequately satisfactory means has been devised for coping with it. In accordance with the present invention, an improved projection screen, and a method of producing it, is provided which effectively and substantially reduces the undesired edge curl heretofore encountered in conventionally made projection screens.

The highly advantageous results achieved in accordance with the present invention are attained in one of its aspects by applying a self-sustaining coating or film of a suitable film-forming substance to the backing fabric laminated to the reverse side of the light-reflecting surface of the screen. Although the invention contemplates coating the entire unlaminated surface of the backing fabric, or at least extensive portions thereof, this is neither necessary for the attainment of an effective reduction in edge curl nor is it economically desirable. Highly effective results can be obtained by limiting the area of the unlaminated surface of the backing fabric coated to a band or strip of narrow dimensions along the vertical margins of the fabric.

In accordance with another, and preferred, aspect of this invention, edge curl in projection screens can be especially effectively reduced by applying as the border, in lieu of the conventionally used solvent thinned paint or lacquer, a pigmented film of a suitable film-forming substance to the plastic sheet, and an unpigmented film of corresponding or greater dimensions of the same or different film-forming substance on the margins of the backing fabric. The film may be applied to the surfaces of the projection screen laminate in various ways such as by brushing, spraying, dipping, or by doctor-knife or doctor-roll. Drying or curing of the film may be allowed to take place at ordinary temperatures, but, in high speed production operations, forced heating at moderately elevated temperature can be utilized with advantage.

Referring to the drawings which illustrate a preferred embodiment of the present invention, but to which the present invention is not restricted since the drawings are merely by way of illustration and not by way of limitation:

Figure 1:
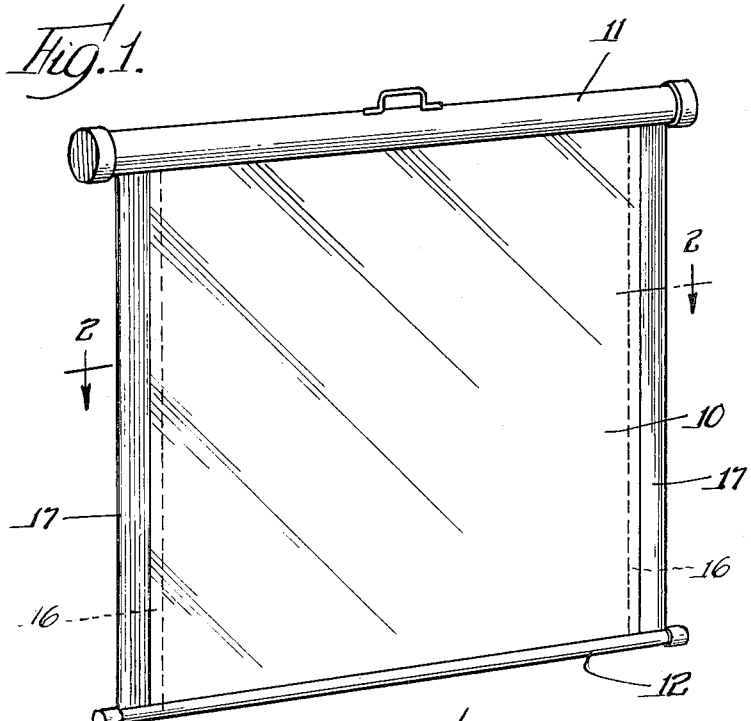
FIG. 1 is a view in perspective of a projection screen incorporating the features of this invention.

The projection screen, designated generally at 10 in FIG. 1, desirably is a laminated, flexible sheet attached at one end to an elongated spring reel or roller (not shown) housed within a case 11, and suitably attached at the other end to a tubular member or bar 12 by means of which the screen may be unrolled and tensioned in a manner to provide a substantially flat exhibiting surface, the tensioning of the screen preferably being in both longitudinal and transverse directions.

In the manufacture of the improved projection screen of this invention any suitable material may be employed in forming the laminate and the light-reflecting surface. In actual production, the screen 10 has been successfully made by forming on a webbed backing fabric 13 a coating 14 of a vinyl resin, such as a polyvinyl chloride resin. The resin can contain a white pigment in which event the unlaminated surface thereof will function as the light-reflecting surface. In the embodiment of the screen illustrated, a specular surface 15 is formed on the outer surface of the resin layer 14 by applying a white pigment coating thereon, or a solution, emulsion or suspension containing aluminum flakes. The resin may be applied to the backing fabric as a single coating or may be built up of a plurality of relatively thin layers to a resultant thickness dependent upon the depth of depressions made by an embossing die. The laminate may be formed by pressing the resin sheet into the meshes of the backing fabric by calendering or the like. The portions of the projection screen thus far described are of conventional construction and may be modified or changed as desired or other types of constructions may be substituted for those here illustrated by way of example.

Figure 2:
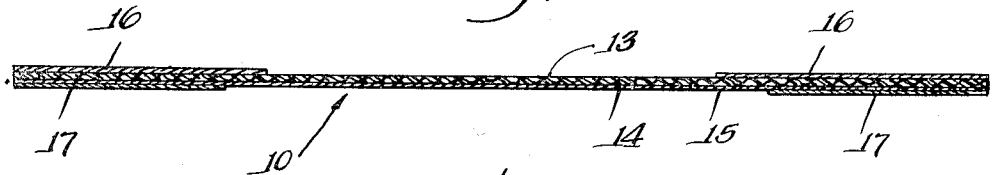
FIG. 2 is a horizontal sectional view taken substantially along line 2—2 of FIG. 1.
Figure 3:
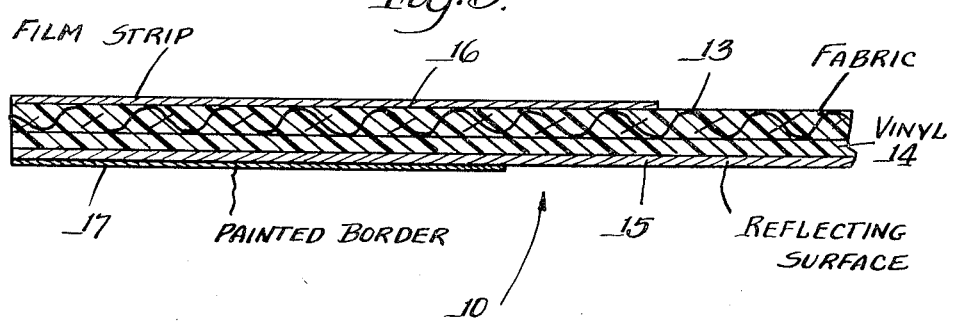
FIG. 3 is an enlarged fragmentary view corresponding to FIG. 2 illustrating in detail the relationship of the various components of a preferred embodiment of a projection screen.

Referring now in greater detail to FIGS. 2 and 3 of the drawings, the unique, substantially edge curl-free projection screen of this invention advantageously is produced by providing the unlaminated surface of the backing fabric 13 with film strips or bands 16—16 of a film-forming substance selected from the group consisting of resins, inert waxy hydrocarbons, and proteinaceous materials, and combinations thereof. As indicated previously hereinabove, the film 16 may be applied to the entire unlaminated surface of the backing fabric to give an excellent product. However, it has found that effective anti-edge curl results can be achieved more economically if the film is applied to the marginal areas only of the fabric. In following this practice, the film band or strip on each of the vertical margins of the screen may be confined to a width of up to six inches, with especially desirable effects being attained with a film strip width of from 2 to 4 inches, more or less.

In the preferred embodiment of the screen illustrated, the edge curl reducing characteristics of the film 16 are enhanced, augmented, and complemented by providing the screen 10 with film strips or bands 17—17 applied on the outer surface, or specularly reflecting surface 15, of the plastic sheet 14. The film strips or bands 17—17 advantageously may be pigmented to serve as an effective substitute for the black or other colored surround, or border, formed of paint or lacquer applied to conventionally manufactured projection screens. The width of the strips or bands 17—17 desirably correspond to that of a typical bordered screen and need not exceed 2 inches, more or less, to produce the desired results.

The resins, inert waxy hydrocarbons, and proteinaceous materials having utility for the purposes of this invention desirably should be suitable for producing self-sustaining films which are essentially non-tacky at ordinary temperatures, have low thermal expansivity, and are resistant, impermeable or impenetrable to not only moisture but also to inorganic and organic liquids and vapors. In addition, they should be capable of producing films which possess good tensile strength and flexibility to enable the screen to which they are applied to be rolled and unrolled over a prolonged period without affecting the integrity of the film or the laminated portions of the screen. Still another important property which the film must possess is compatibility with the backing fabric and/or the plastic sheet and the light-reflecting surface. Further, the film-forming materials desirably should be capable of being applied as a solution in an organic solvent or, especially desirably, as an aqueous despersion or latex.

Various resins, both synthetic and natural, can be utilized to achieve the objectives of this invention. Particularly advantageous results are attained with colloidal suspensions of synthetic resin particles in water. Such suspensions are commonly referred to as resin latexes and are produced in accordance with standard emulsion polymerization techniques to provide compositions having a total solids content of from about 45% to 55%. These preferred materials may be exemplified by suspensions of such film-forming resins as polyvinyl chloride, polyvinylidene chloride, polyvinyl acetate, polyvinyl butyral, polystyrene, polymethyl methacrylate, and copolymers of the monomeric constituents thereof. The resins may be compounded with stabilizers, plasticizers, lubricants, colorants, or other modifying agents as may be necessary or desirable to impart the required characteristics to the film.

Among the natural resins having utility for the purposes of this invention are rosin, copal, and certain thermoplastic materials procured by oxidizing the semi-fluid resin occurring in crude gutta-percha and balata. Especially desirable results have been attained with rosin which has been chemically modified by liming, oxidation, or by any of the various other well known methods of imparting improved film-forming characteristics to the substance.

Similarly, various inert waxy hydrocarbons can be utilized to form the film strips or bands on the projection screen of the present invention. It has been found, however, that emulsions, having a total solids content of about 45% to 55%, of microcrystalline petroleum waxes are particularly desirable. The product sold under the trade identification "Paracol" is representative of such waxes. These waxes may be employed with or without the addition of paraffin to provide an excellent film.

A wide variety of proteinaceous materials find utility in achieving the objectives of this invention. Of this group, particularly desirable results are obtained with such materials as soy protein, casein, and albumin which have been suitably chemically modified or otherwise treated to render them capable of forming a film having the desired properties. Additives may be incorporated into the proteinaceous materials to inhibit attack thereof by biological agents.

Highly effective anti-edge curl films can be produced in accordance with this invention by forming a solution, emulsion, or suspension of a mixture of the aforesaid film-forming materials. Such combinations, especially those containing the inert waxy hydrocarbons, provide self-sustaining films characterized by their substantially complete lack of tackiness, excellent elastomeric properties and high tensile strength. In forming mixed emulsions or suspensions with the waxes, the resin or proteinaceous material desirably is present in the amount of from 20% to 60%, the wax constituent usually comprising the remainder of the solids content.

The thickness of the films formed on the projection screens of the present invention is, of course, variable. In all instances, however, they should not be so thick as to interfere with the flexibility of the screen. In general, the film strips or bands have a thickness of the order of 0.5 ml to about 3 mils, but more desirably are of a thickness of from 1 to 2 mils. To achieve the desired thickness it is usually necessary to apply only a single coating of the solution or emulsion or dispersion of the film-forming material on the appropriate surfaces of the screen. However, it is contemplated that more than one application of the material may be desirable or even necessary to attain the anti-edge curl effect.

Although the film strips or bands can be applied to the projection screen manually, such as by brushing, for example, the coating operation, from an economic standpoint, advantageously is conducted in a continuous manner in accordance with known coating techniques and utilizing mechanical coating apparatus. In utilizing such high speed techniques it is usually necessary to employ heat to dry or cure the film. In a typical continuous coating operation, a solution, emulsion or suspension of the film-forming material is applied as by spraying or roller coating onto the appropriate laminated screen surfaces, and the thus coated screen is passed through an oven where the film is cured by heat, for instance, by counterflow current of heated air.

The temperatures employed in the curing step generally are dependent on the nature of the film-forming materials and the liquid vehicle employed in connection therewith. Many of the film-forming materials suitable for use in making the novel projection screens of this invention will cure at room temperature and, obviously, in such cases no forced air heating or other heating apparatus is required. However, in continuous operations where production rates are such that it is impractical, from a time consumption standpoint, to cure at ordinary temperatures, or in those instances wherein the nature of the film-forming material will not permit a complete cure to be effected at room temperatures, heating techniques advantageously are utilized. In accordance with the preferred practice of this invention, it is desirable in such circumstances that the self-sustaining films be capable of being converted to a substantially insoluble, infusible state at temperatures not appreciably exceeding 250 degrees F. Temperatures up to about 225 degrees F. or 250 degrees F. are preferred, with curing temperatures ranging below 225 degrees F. being especially desirable. By maintaining the curing temperatures at the levels indicated, the likelihood of unfavorably or deleteriously affecting the integrity of the backing fabric-plastic sheet laminate of the projection screen is substantially reduced.

The amount of time required to cure the film-forming materials, of course, will be variable. Generally, depending on the properties of the film-forming material, desirable results can be attained at room temperatures in a matter of minutes. In the event heated forced air techniques are employed, effective cures can be accomplished in a few seconds.

The following examples are illustrative of anti-edge curl film-forming compositions having utility in the present invention. It will be understood that various changes may be made in the formulations with respect to proportions of the ingredients and that numerous other compositions can readily be evolved in the light of the teachings disclosed herein.

Example 1

A pigmented border coating for the vertical edge portions of the light-reflecting surface of a laminated screen was prepared by mixing together 100 parts vinyl chloride-vinyl acetate copolymer latex (e.g. the product sold under the trade identification "Geon" 450 x 167), 1 part of a 50% water dispersed paste of $TiO_2$, 9 parts of a water dispersed black pigment, and 10 parts water.

An unpigmented coating for the vertical edge portions of the backing fabric of the same screen was prepared by mixing 75 parts acrylic resin latex (e.g. the product sold under the trade identification "Rhoplex" B15) and 25 parts of a paraffin wax emulsion (e.g. the product sold under the trade identification "Mobilcer" C).

The front and rear vertical edge portions of the laminated screen were coated to a width of 2 inches with the appropriate one of the above compositions by means of a roller. The edge coatings were cured at a temperature of 215 degrees F. for a period of 30 seconds. The films formed on the screen were non-tacky and flexible, and no edge curl was apparent along the vertical margins of the screen.

Example 2

A mixture of 500 parts water, 100 parts of a commercial grade soy protein, and 20 parts of a 16% borax solution were heated at a temperature of 137 degrees F. with agitation. The colloidal suspension formed was applied to the backing fabric of a white-pigmented vinyl laminate projection screen with a brush and allowed to dry at room temperature. The screen retained its flexible character and the margins thereof showed no apparent tendency to curl.

Example 3

To 100 parts of the suspension obtained as described in Example 2, 100 parts of a microcrystalline wax emulsion (e.g. the product sold under the trade identification "Paracol"), was added. After thorough mixing, the resulting suspension was applied to the vertical margins of the backing fabric of a white-pigmented vinyl laminate projection screen with a brush and allowed to dry at room temperature. A self-sustaining film was formed on the margins of the backing fabric and the edges of the screen showed no apparent tendency to curl.

While a specific embodiment of the invention has been illustrated and described, it is to be understood that many modifications are possible without departing from the spirit and scope of the invention.

I claim:

1. A flexible projection screen of the front projection type having a backing material on one side thereof and a light-reflecting surface on the other side thereof and being rollable upon itself, said screen being secured along two of its opposite margins to means enabling the screen to be unrolled in a manner to provide a substantially flat exhibiting surface, the other two margins of the screen being free when the screen is in an unrolled position, and a dry, non-tacky coating on the backing material of the screen, said coating extending along at least the free margins of the screen and covering an area thereof up to about six inches in width, said coating being characterized by being compatible with said backing material and having sufficient flexibility and cohesiveness to enable the screen to be rolled and unrolled over a prolonged period without affecting the integrity of the coating and having a mass and thickness sufficient to reduce any tendency of the free margins of the screen to curl when the screen is in an unrolled position for viewing an image projected thereon without interfering with the rollability of the screen.

2. A flexible projection screen of the front projection type having a backing material on one side thereof and a light-reflecting surface on the other side thereof and being rollable upon itself, said screen being secured along two of its opposite margins to means enabling the screen to be unrolled in a manner to provide a substantially flat exhibiting surface, the other two margins of the screen being free when the screen is in an unrolled position, and a dry, non-tacky coating on the backing material of the screen, said coating extending along at least the free margins of the screen and covering an area thereof of from about two to four inches in width, said coating being characterized by being compatible with said backing material and having sufficient flexibility and cohesiveness to enable the screen to be rolled and unrolled over a prolonged period without affecting the integrity of the coating and having a thickness of from about 0.5 to about 3 mils, said coating acting to reduce any tendency of the free margins of the screen to curl when the screen is in an unrolled position for viewing an image projected thereon.

3. A flexible projection screen of the front projection type having a backing material on one side thereof and a light-reflecting surface on the other side thereof and being rollable upon itself, said screen being secured along two of its opposite margins to means enabling the screen to be unrolled in a manner to provide a substantially flat exhibiting surface, the other two margins of the screen being free when the screen is in an unrolled position, and a dry, non-tacky film of a film-forming substance on the backing material of the screen and on the light-reflecting surface thereof, said film extending along at least the free margins of said material and said surface and covering an area thereof up to about six inches in width, said film being characterized by being formed of a film-forming substance which is compatible with said backing material and said light-reflecting surface and having sufficient flexibility and cohesiveness to enable the screen to be rolled and unrolled over a prolonged period without affecting the integrity of the film on said material and said surface and having a mass and thickness sufficient to reduce any tendency of the free margins of the screen to curl when the screen is in an unrolled position for viewing an image projected thereon without interfering with the rollability of the screen.

4. A flexible projection screen of the front projection type having a backing material on one side thereof and a light-reflecting surface on the other side thereof and being rollable upon itself, said screen being secured along two of its opposite margins to means enabling the screen to be unrolled in a manner to provide a substantially flat exhibiting surface, the other two margins of the screen being free when the screen is in an unrolled position, and a dry, non-tacky film of a film-forming substance on the backing material of the screen and the light-reflecting surface thereof, said film extending along at least the free margins of said material and said surface and covering an area thereof of from about two to about four inches in width, said film being formed from a resin and being characterized by being compatible with said backing material and said light-reflecting surface and having sufficient flexibility and cohesiveness to enable the screen to be rolled and unrolled over a prolonged period without affecting the integrity of the film on said material and said surface and having a thickness of from about one to about two mils, said films cooperating to reduce any tendency of the free margins of the screen to curl when the screen is in an unrolled position for viewing an image projected thereon without interfering with the rollability of the screen.

5. A flexible projection screen of the front projection type having a backing material on one side thereof and a light-reflecting surface on the other side thereof and being rollable upon itself, said screen being secured along two of its opposite margins to means enabling the screen to be unrolled in a manner to provide a substantially flat exhibiting surface, the other two margins of the screen being free when the screen is in an unrolled position, and a dry, non-tacky film of a film-forming substance on the backing material of the screen and the light-reflecting surface thereof, said film extending along at least the free margins of said material and said surface and covering an area thereof of from about two to about four inches in width, said film being formed from a resin and microcrystalline wax and being characterized by being compatible with said backing material and said light-reflecting surface and having sufficient flexibility and cohesiveness to enable the screen to be rolled and unrolled over a prolonged period without affecting the integrity of the film on said material and said surface and having a thickness of from about one to about two mils, said films cooperating to reduce any tendency of the free margins of the screen to curl when the screen is in an unrolled position for viewing an image projected thereon without interfering with the rollability of the screen.

6. A flexible projection screen of the front projection type having a backing fabric laminated to the reverse side of the light-reflecting surface thereof and being rollable upon itself, said screen being secured along two of its opposite margins to means enabling the screen to be unrolled and tensioned in a manner to provide a substantially flat exhibiting surface, the other two margins of the screen being free when the screen is in an unrolled and tensioned position, and a dry, non-tacky, self-sustaining, flexible film of a film-forming proteinaceous material on the unlaminated surface of the backing fabric of the screen and a dry, non-tacky, flexible film of vinyl chloride-vinyl acetate copolymer latex on and along the free margins of the light-reflecting surface, said films cooperating to substantially reduce any tendency of the free margins of the screen to curl when the screen is in an unrolled position for viewing an image projected thereon.

References Cited by the Examiner
UNITED STATES PATENTS

| | | | |
|---|---|---|---|
| 1,594,951 | 8/1926 | Headding et al. | 88—28.93 X |
| 2,184,672 | 12/1939 | Jackman | 88—28.93 X |
| 2,341,982 | 2/1944 | Dillehay | 88—28.93 |
| 2,726,222 | 12/1955 | Palmquist et al. | 88—28.9 X |
| 2,875,087 | 2/1959 | Crandon. | |

JULIA E. COINER, *Primary Examiner.*